(12) United States Patent
Ling

(10) Patent No.: US 7,442,298 B2
(45) Date of Patent: Oct. 28, 2008

(54) HIGH-DENITRIFICATION SHARED TYPE ORBAL OXIDATION DITCH

(75) Inventor: Jianjun Ling, Yixing, Jiangsu (CN)

(73) Assignee: Yixing Lingzhi Environmental Co., Ltd., Hegiao Town, Yixing Jiangsu (CN)

( * ) Notice: Subject to any disclaimer, the term of this patent is extended or adjusted under 35 U.S.C. 154(b) by 0 days.

(21) Appl. No.: 12/067,176

(22) PCT Filed: Jan. 5, 2007

(86) PCT No.: PCT/CN2007/000025

§ 371 (c)(1),
(2), (4) Date: Mar. 18, 2008

(87) PCT Pub. No.: WO2007/085177

PCT Pub. Date: Aug. 2, 2007

(65) Prior Publication Data

US 2008/0179231 A1    Jul. 31, 2008

(30) Foreign Application Priority Data

Jan. 26, 2006    (CN) .................... 2006 1 0038130

(51) Int. Cl.
*C02F 3/00* (2006.01)

(52) U.S. Cl. .................... 210/194; 210/256; 210/926

(58) Field of Classification Search ................. 210/194, 210/256, 926
See application file for complete search history.

(56) References Cited

U.S. PATENT DOCUMENTS 4,975,197 A * 12/1990 Wittmann et al. ........... 210/626
5,084,167 A *  1/1992 Beard et al. ................. 210/194

* cited by examiner

*Primary Examiner*—Chester T. Barry
(74) *Attorney, Agent, or Firm*—Global IP Services; Tianhua Gu

(57) ABSTRACT

A high denitrification shared type Orbal oxidation ditch, pertaining to water treatment technical field, comprises an outer channel, a median channel, an inner channel, all of ellipse, and a secondary deposition tank. Wherein, the length of the outer channel is prolonged in the ellipse's major axis direction and the secondary deposition tank that is tangential to the inner wall or shares the wall with the outer channel is arranged between the outer and median channels. All the channels (the outer channel, the median channel and the inner channel) and the secondary deposition tank are integrated in the Orbal oxidation ditch, all of the anaerobic zone, regulation zone, hydrolysis acidifying zone, primary deposition zone, sludge outer re-circulation zone and wastewater inner re-circulation zone etc. can also be arranged in other space, in this way, to reduce the area occupied and the investment cost for the entire equipment to the minimum values, prolong the residence time in the oxidation ditch remarkably and make the total denitrification efficiency very high.

11 Claims, 7 Drawing Sheets

HIGH-DENITRIFICATION SHARED TYPE ORBAL OXIDATION DITCH

FIELD OF THE INVENTION

The present invention relates to an Orbal oxidation ditch, pertaining to water treatment technical field, in particular, to a high-denitrification shared type Orbal oxidation ditch combining processes of anaerobic, deposition and oxidation channels, sludge and wastewater re-circulations.

BACKGROUND OF THE INVENTION

A typical Orbal oxidation ditch (shortened to "Orbal" in English) comprises an anoxic channel, a facultative anaerobic channel, an aerobic channel and a central island, outer channel, median channel and inner channel for short respectively. The tank bodies generally assume the shape of an ellipse with some of them in the shape of round and the deposition tank is set in the center.

As disclosed in the Chinese Patent No. CN03223656.5 that "A wastewater treatment device using A2/O oxidation ditch process", the device consists of an anaerobic tank, an anoxic tank, an oxidation ditch and a deposition tank, wherein the combination of the deposition tank and the oxidation ditch forms the tank body in the shape of concentric double-walled cylinder with the oxidation ditch around the outer side, the deposition tank inside and the anoxic tank located outside of the oxidation ditch as well as very near to the anaerobic tank outside of the anoxic tank.

Although this design saves the space between tanks, and the connecting pipes in shared walls between tank bodies, the round deposition tank at the central island is an individual one and the whole oxidation ditch body has a huge volume without denitrification system, whereas a high-denitrification internal cyclic system is needed for the Orbal oxidation ditch having total nitrogen removal requirements.

In accordance with the code for the design of water supply and sewerage in China's cities, the residence time in oxidation ditch shall be at least 16 hours. The contradiction between the residence time and the volume of the oxidation ditch, the establishment of individual denitrification system limit the popularization of this kind of wastewater treatment device. While other treatment systems in need of anaerobic system and deposition tank further solely-built also lead to the fact that the Orbal oxidation ditch is incapable of being widely applied. Especially, the outer channel of the Orbal oxidation ditch is over wide (based on process requirements, the outer channel covers more than 50% of the total oxidation ditch in volume, which results in the reduction of media circulation times, and particularly, too narrow spacing between the aeration turntables set on the outer channel creates unobvious diversities between aerobic-anaerobic-aerobic . . . , unobvious nitrification and denitrification effects, and unobvious denitrification effect apparently, thus removing the total nitrogen only a little.

SUMMARY OF THE INVENTION

It is an object of the present invention to provide, exactly for overcoming the prior art shortcomings as described above, a high-denitrification shared type Orbal oxidation ditch, which integrates a secondary deposition tank with the outer channel, the median channel and the inner channel of the Orbal oxidation ditch, in this way, to decrease the area occupied as well as investment cost. And the major innovation lies in that the length of the outer channel of the elliptic oxidation ditch is prolonged and the secondary deposition tank that at least shares the wall with the inner wall of the outer channel is positioned outside of the median channel, the embodiment includes: a high-denitrification shared type Orbal oxidation ditch, comprising an outer channel, a median channel, an inner channel all of ellipse and a secondary deposition tank, is characterized in that, the length of the outer channel is prolonged in the ellipse's longer axis direction and the said secondary deposition tank that is tangential to the inner wall or shares the wall with the outer channel is arranged between the outer and median channels. In order to further utilize shared walls and lessen cost, the optimal method is that the secondary deposition tank and the inner wall of the outer channel share the semicircular wall.

For the purpose of making use of the remaining space of the oxidation ditch, the present invention further utilizes the central island position to arrange a treatment zone, which can be anaerobic zone, regulation zone, hydrolysis acidifying zone, primary deposition zone etc., wherein anaerobic zone is preferred, in order to integrate varying processes, thus to shorten the connecting pips between various process zones and additional fittings to the utmost extent; for the sake of gaining more residence time of wastewater in the oxidation ditch and improving the denitrification efficiency, in the present invention, an inner re-circulation zone is arranged in the intermediate space or partial intermediate space between the outer wall of the median channel, the inner wall of the outer channel and the secondary deposition tank, wherein the inner re-circulation zone that is communicated with the water in the pipe of the inner channel is connected with the weir-flow weir of the secondary deposition tank, an underwater sewage propeller (or referred to as re-circulation pump) leading to the outer channel is placed in the inner re-circulation zone. Part of wastewater in the inner re-circulation zone flows back to the outer channel through the valve and the outlet hole via the submersible propeller, and by regulating the using quantity of the propellers, the inner circulation water increases by several times in amount, thus to drastically extend the residence time of the wastewater in the oxidation ditch, increase the removal rate of COD, BOD, ammonia, nitrogen, in particular, the total nitrogen to a great degree; in the present invention, an outer re-circulation zone used to communicate with the secondary deposition tank can be individually arranged in intermediate space or partial intermediate space between the outer wall of the median channel, the inner wall of the outer channel and the secondary deposition tank, and an underwater sewage propeller leading to the outer channel is placed in the outer re-circulation zone, in this way, the sludge in the secondary deposition tank is forced into the outer re-circulation zone under pressure, and flows back to the outer channel via the underwater propeller, increasing the activated sludge content in the oxidation ditch. In pursuit of further improving the denitrification effects comprehensively and getting more compact processes for the present invention, the intermediate space between the outer wall of the median channel, the inner wall of the outer channel and the secondary deposition tank is separated into the inner re-circulation zone and the outer re-circulation zone, wherein the former that is communicated with the inner channel pipe water is connected with the weir-flow weir of the secondary deposition tank and the latter is communicated with the secondary deposition tank; the sewage and sludge propellers leading to the outer channel are respectively placed in the inner and outer re-circulation zones; the arrangement in the intermediate space enables the secondary deposition tank to be tangential to the outer wall of the median channel, and moreover, the tangential point just partitions the inner re-circulation zone and the outer re-circulation zone and also segregates the space between the secondary deposition tank and the outer wall of the median channel, wherein lies a partition wall to separate the intermediate space into the inner re-circulation zone the outer re-circulation zone.

The high-denitrification shared type Orbal oxidation ditch for the present invention is capable of integrating the outer channel, the median channel, the inner channel and the secondary deposition tank of the Orbal oxidation ditch; its leftover space can be further provided the anaerobic zone, regulation zone, hydrolysis acidifying zone, primary deposition zone, sludge outer re-circulation zone and wastewater inner re-circulation zone, etc., to reduce the area occupied and the investment cost for the entire equipment into the minimum values, prolong the residence time in the oxidation ditch remarkably and make the total denitrification efficiency high. To sum up, the advantages include:

1. The shared walls due to the integration of the secondary deposition tank, anaerobic zone or regulation zone, inner re-circulation and sludge outer re-circulation system not only save a lot of area occupied and makes full use of the leftover space of the traditional Orbal oxidation ditch, but also spare the pipes, pump and valve systems for these facilities individually constructed, decreasing investment cost a lot accordingly;

2. The leftover areas are utilized to construct the inner re-circulation and gravity sludge re-circulation and the underwater propellers leave out lift pump, which requires no additional power investments during operating, and therefore operating expenses are lessened drastically.

3. In the equipment, the anaerobic zone designed in the leftover area of the central island is employed to facilitate denitrification, the inner re-circulation enables the circulation of the activated mixed liquor in the inner channel to prolong the residence time of water in the oxidation ditch, thus to increase the re-circulation times of the mixed liquor in the ditch and further take effects of nitrification and denitrification and help denitrification, ensuring the high denitrification efficiency of the entire equipment.

4. Due to the prolonged length of the outer channel, the spacing between the aeration turntables is extended, i.e., twice of the spacing between the aeration turntables of the outer channel for the existing common Orbal oxidation ditch, thus to further prolong the time between the aerobic and anaerobic periods, boost up the aerobic-anaerobic-aerobic . . . , nitrification and denitrification effects remarkably, make the outer channel intensify its anaerobic function and prolong the circulation times of media in the outer channel, finally, to strengthen the denitrification effect and better ensure the total nitrogen removal.

5. Whenever there is a rainstorm in the use of the equipment, shut down the underwater propeller in the inner re-circulation zone (or referred to as inner re-circulation pump) and open the valve, then rainwater will directly flow into the secondary deposition tank through the outer channel after passing the treatment zone of the central island, needless to get through the median channel and the inner channel, to ensure the sludge activation not to be damaged and the system to be reused, and to protect against storm impact consequently.

DETAILED DESCRIPTION OF THE INVENTION

Figure 1:
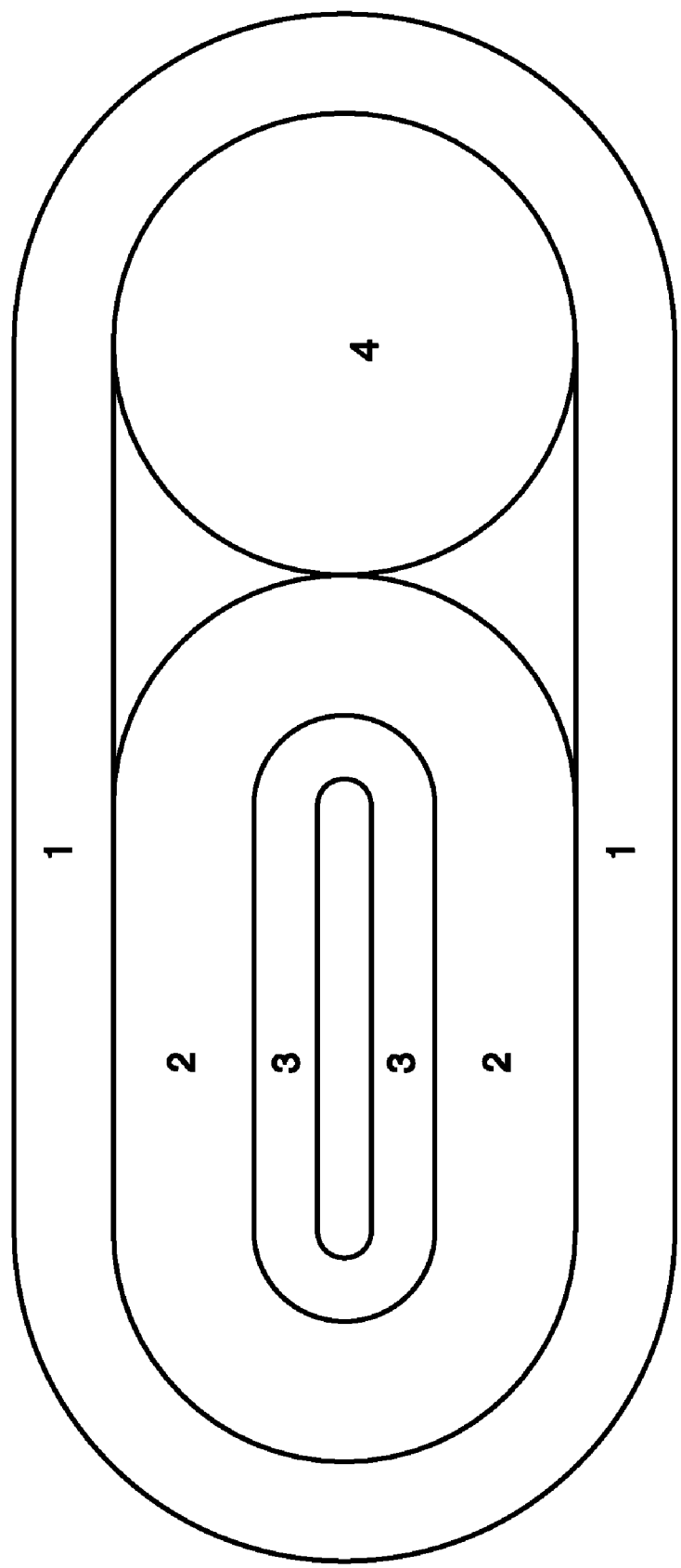
FIG. 1 is the schematic structural view of Embodiment 1 for the present invention.
Figure 2:
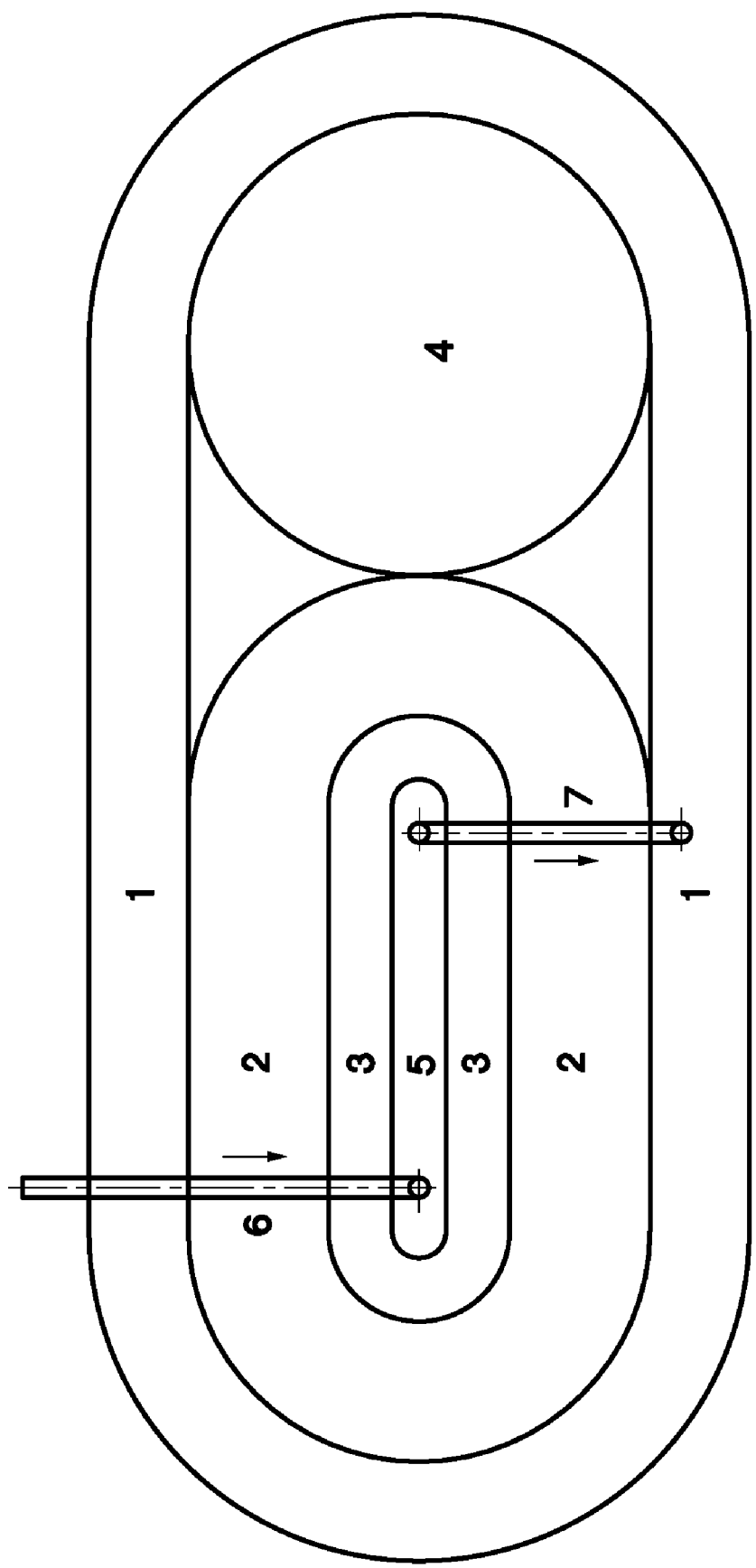
FIG. 2 is the s schematic structural view of Embodiment 2 for the present invention.
Figure 3:
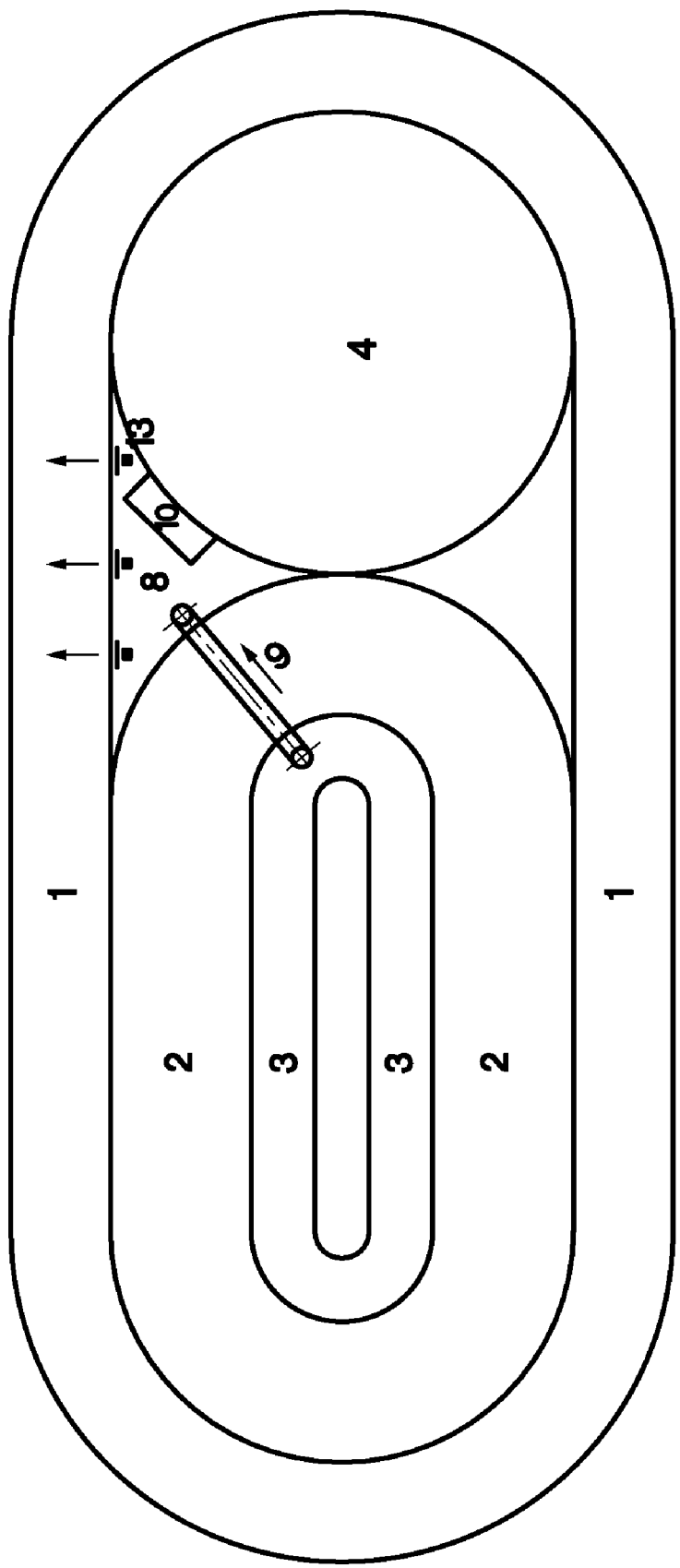
FIG. 3 is the schematic structural view of Embodiment 3 for the present invention.
Figure 4:
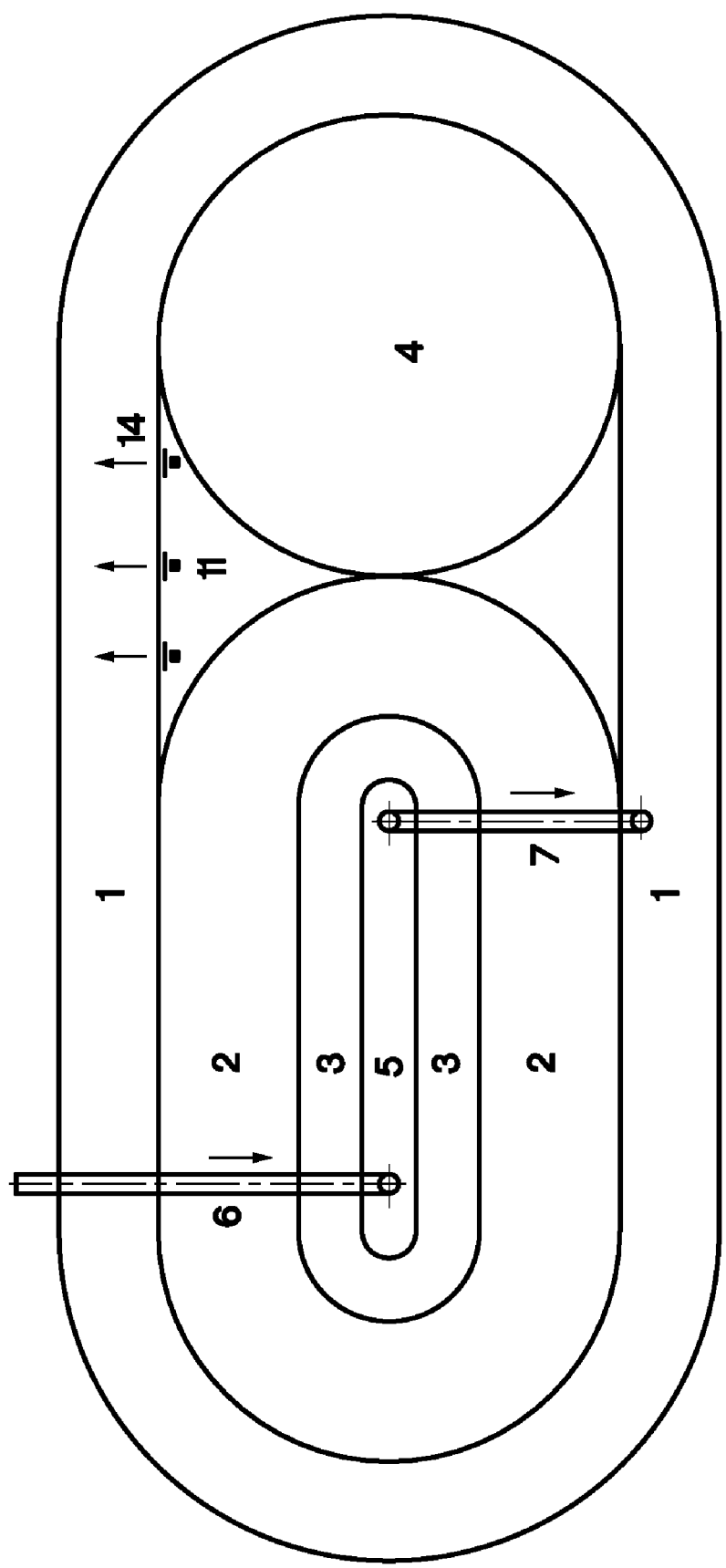
FIG. 4 is the schematic structural view of Embodiment 4 for the present invention.
Figure 5:
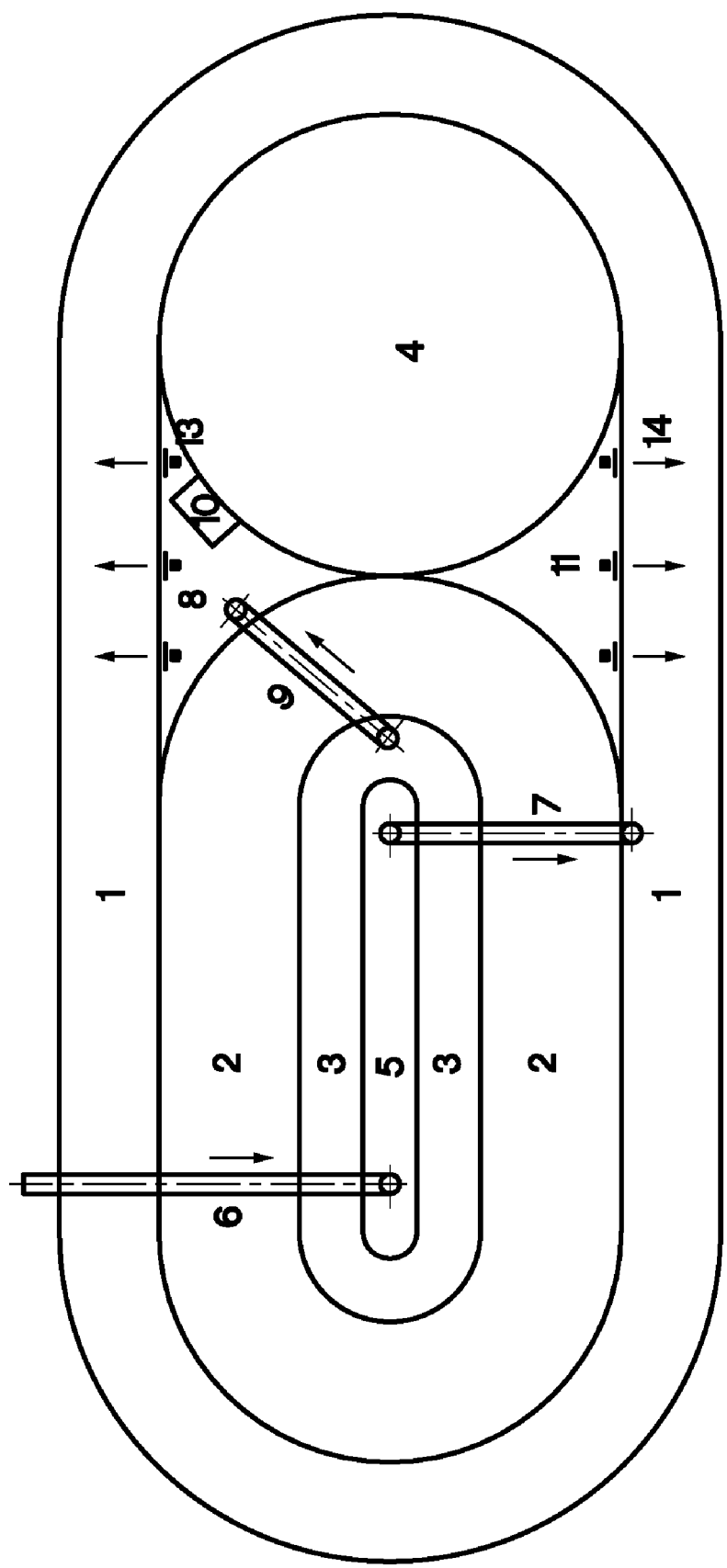
FIG. 5 is the schematic structural view of Embodiment 5 for the present invention.
Figure 6:
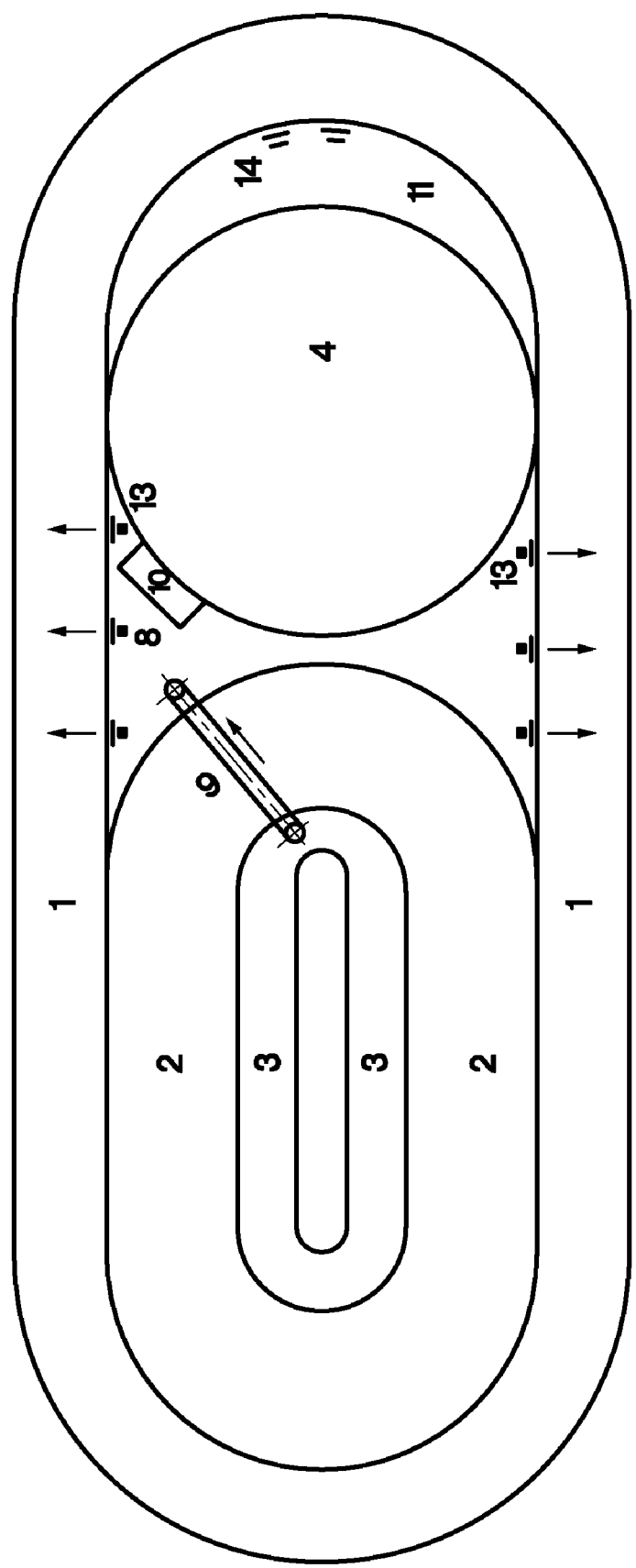
FIG. 6 is the schematic structural view of Embodiment 6 for the present invention.
Figure 7:
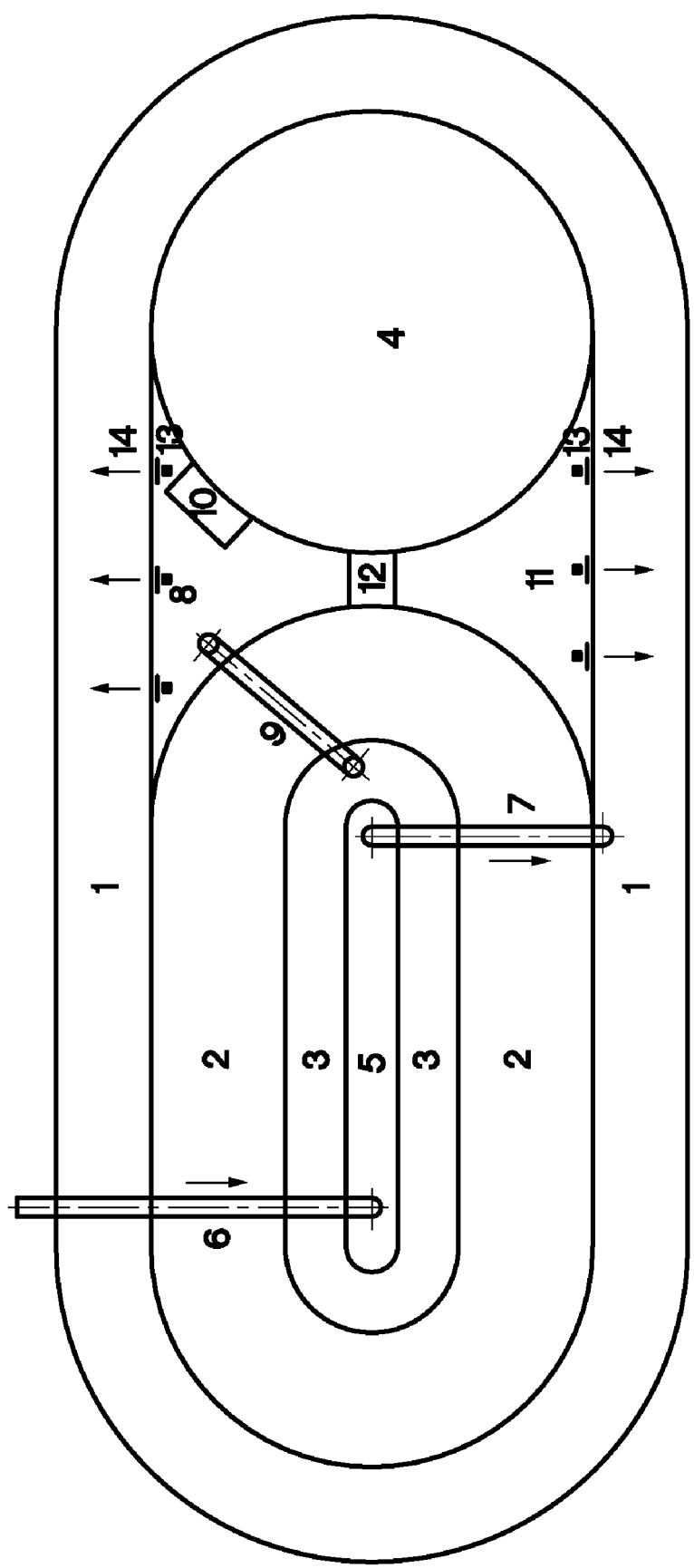
FIG. 7 is the schematic structural view of Embodiment 7 for the present invention.

In Embodiment 1, the high-denitrification shared type Orbal oxidation ditch comprises an outer channel 1, a median channel 2, an inner channel 3, all of ellipse, and a secondary deposition tank 4, wherein, the length of the outer channel 1 of the oxidation ditch is prolonged in the ellipse's major axis direction and a secondary deposition tank 4 that shares the semicircular wall with the inner wall of the outer channel 1 is arranged between the outer wall of the median channel 2 and the inner wall of the outer channel 1.

In Embodiment 2, the high-denitrification shared type Orbal oxidation ditch comprises an outer channel 1, a median channel 2, an inner channel 3, all of ellipse, and a secondary deposition tank 4, wherein, the length of the outer channel 1 of the oxidation ditch is prolonged in the ellipse's major axis direction and a secondary deposition tank 4 that shares the semicircular wall with the inner wall of the outer channel 1 is arranged between the outer wall of the median channel 2 and the inner wall of the outer channel 1; an anaerobic zone 5 that is communicated with the water in a pipe 7 of the outer channel 1 is placed at the central island position of the oxidation ditch with an inlet pipe 6 connected to the zone 5.

In Embodiment 3, the high-denitrification shared type Orbal oxidation ditch comprises an outer channel 1, a median channel 2, an inner channel 3, all of ellipse, and a secondary deposition tank 4, wherein, the length of the outer channel 1 of the oxidation ditch is prolonged in the ellipse's major axis direction and a secondary deposition tank 4 that shares the semicircular wall with the inner wall of the outer channel 1 is arranged between the outer wall of the median channel 2 and the inner wall of the outer channel 1; an inner re-circulation zone 8 that is communicated with water in a pipe 9 of the inner channel 3 and connected with the weir-flow weir 10 of the secondary deposition tank 4 is arranged in the intermediate space between the outer wall of the median channel, the inner wall of the outer channel and the secondary deposition tank, with an underwater sewage propeller 13 leading to the outer channel 1 provided in the zone 8.

In Embodiment 4, the high-denitrification shared type Orbal oxidation ditch comprises an outer channel 1, a median channel 2, an inner channel 3, all of ellipse, and a secondary deposition tank 4, wherein, the length of the outer channel 1 of the oxidation ditch is prolonged in the ellipse's major axis direction and a secondary deposition tank 4 that is tangential to the outer wall of the median channel 2 and shares the semicircular wall with the inner wall of the outer channel 1 is arranged between the outer wall of the median channel 2 and the inner wall of the outer channel 1; an anaerobic zone 5 that is communicated with the water in a pipe 7 of the outer channel 1 is placed at the central island position of the oxidation ditch with an inlet pipe 6 connected to the zone 5; an outer re-circulation zone 11 used to communicate with the secondary deposition tank 4 is arranged in the intermediate space between the outer wall of the median channel 2, the inner wall of the outer channel 1 and the secondary deposition tank 4, and an underwater sewage propeller 14 leading to the outer channel 1 is placed in the outer re-circulation zone 11.

In Embodiment 5, the high-denitrification shared type Orbal oxidation ditch comprises an outer channel 1, a median channel 2, an inner channel 3, all of ellipse, and a secondary deposition tank 4, wherein, the length of the outer channel 1 of the oxidation ditch is prolonged in the ellipse's major axis direction and a secondary deposition tank 4 that shares the semicircular wall with the inner wall of the outer channel 1 is arranged between the outer wall of the median channel 2 and the inner wall of the outer channel 1; an anaerobic zone 5 that is communicated with water in the pipe 7 of the outer channel 1 is placed at the central island position of the oxidation ditch with an inlet pipe 6 connected to the zone 5; the secondary deposition tank 4 is tangential to the outer wall of the median channel 2, wherein the tangential point partitions the intermediate space between the outer wall of the median channel 2, the inner wall of the outer channel 1 and the secondary deposition tank 4 into an inner re-circulation zone 8 and an outer re-circulation zone 11, wherein, the inner re-circulation zone 8 is communicated with the water in a pipe 9 of the inner channel 3 and connected with the weir-flow weir 10 of the secondary deposition tank 4 with a sewage propeller 13 leading to the outer channel 1 placed in the zone 8, the outer re-circulation zone 11 is communicated with the secondary deposition tank 4 and a sludge propeller 14 leading to the outer channel 1 is placed in the zone 11.

In Embodiment 6, the high-denitrification shared type Orbal oxidation ditch comprises an outer channel 1, a median channel 2, an inner channel 3, all of ellipse, and a secondary deposition tank 4, wherein, the length of the outer channel 1 of the oxidation ditch is prolonged in the ellipse's major axis direction and a secondary deposition tank 4 that is tangential to the inner wall of the outer channel 1 is arranged between the outer wall of the median channel 2 and the inner wall of the outer channel 1; there is space left on both sides of the secondary deposition tank 4, wherein, in the space on one side sets an inner re-circulation zone 8 that is communicated with the water in a pipe 9 of the inner channel 3 and connected with the weir-flow weir 10 of the secondary deposition tank 4 with a sewage propeller leading to the outer channel 1 in the zone 8, and in the space of the other side sets an outer re-circulation zone 11 that is communicated with the secondary deposition tank 4 with a sludge propeller leading to the outer channel 1 placed in the zone 11.

In Embodiment 7, the high-denitrification shared type Orbal oxidation ditch comprises an outer channel 1, a median channel 2, an inner channel 3, all of ellipse, and a secondary deposition tank 4, wherein, the length of the outer channel 1 of the oxidation ditch is prolonged in the ellipse's major axis direction and a secondary deposition tank 4 that shares the semicircular wall with the inner wall of the outer channel 1 is arranged between the outer wall of the median channel 2 and the inner wall of the outer channel 1; an anaerobic zone 5 that is communicated with the water in a pipe 7 of the outer channel 1 is placed at the central island position of the oxidation ditch with an inlet pipe 6 connected to the zone 5; there is intermediate space between the secondary deposition 4 and the median channel 2, wherein lies a partition wall 12 to separate the intermediate space into the inner re-circulation zone 8 and the outer re-circulation zone 11, wherein the former (8) that is communicated with the water in a pipe 9 of the inner channel 3 and connected with the weir-flow weir 10 of the secondary deposition tank 4 has a sewage propeller 13 inside leading to the outer channel 1, the latter (11) that is communicated with the secondary deposition tank 4 has a sludge propeller 13 inside leading to the outer channel 1.

What is claimed is:

1. A high-denitrification shared type orbal oxidation ditch comprising: an ellipsoidal outer channel, an ellipsoidal median channel located in the outer channel, an ellipsoidal inner channel located in the median channel and a central island being encircled by the median channel;
   a secondary deposition tank being arranged between the outer wall of the median channel and the inner wall of the outer channel, the wall of the secondary deposition tank being tangential to or partly sharing the inner wall of the outer channel.

2. The high-denitrification shared type orbal oxidation ditch as claimed in claim 1, wherein the secondary deposition tank shares a semicircular wall with the inner wall of the outer channel.

3. The high-denitrification shared type orbal oxidation ditch as claimed in claim 1, characterized in that a treatment zone is arranged at the central island position.

4. The high-denitrification shared type orbal oxidation ditch as claimed in claim 3, wherein the central island place is designed as anaerobic zone or regulation zone or hydrolysis acidifying zone or primary deposition zone.

5. The high-denitrification shared type orbal oxidation ditch as claimed in claim 4, wherein an inlet pipe is connected to the anaerobic zone that is connected with the outer channel.

6. The high-denitrification shared type orbal oxidation ditch as claimed in claim 1, wherein an inner re-circulation zone is arranged in an intermediate space or a part of the intermediate space defined by the outer wall of the median channel, the inner wall of the outer channel and the secondary deposition tank, the inner re-circulation zone is connected with the inner channel and a weir-flow weir of the secondary deposition tank and has an underwater sewage propeller inside for leading sewage to the outer channel.

7. The high-denitrification shared type orbal oxidation ditch as claimed in claim 1, wherein an outer re-circulation zone that is communicated with the secondary deposition tank is arranged in intermediate space or part of the intermediate space defined by the outer wall of the median channel, the inner wall of the outer channel and the secondary deposition tank, the outer re-circulation zone has an underwater sludge propeller inside for leading sludge to the outer channel.

8. The high-denitrification shared type orbal oxidation ditch as claimed in claim 1, wherein an intermediate space defined by the outer wall of the median channel, the inner wall of the outer channel and the secondary deposition tank is separated into an inner re-circulation zone and an outer re-circulation zone, the inner re-circulation zone is communicated with the water in the pipe of the inner channel and connected with the weir-flow weir of the secondary deposition tank, the outer re-circulation zone is communicated with the secondary deposition tank, a sewage and a sludge propellers leading to the outer channel are respectively placed in the inner and outer re-circulation zones 9. The high-denitrification shared type orbal oxidation ditch as claimed in claim 8, wherein the secondary deposition tank is tangential to the outer wall of the median channel, the tangential point partitions the inner re-circulation zone and the outer re-circulation zone.

10. The high-denitrification shared type orbal oxidation ditch as claimed in claim 8, wherein the secondary deposition tank and the outer wall of the median channel are detached, a partition wall connecting them together to separate the intermediate space into the inner re-circulation zone the outer re-circulation zone.

11. The high-denitrification shared type orbal oxidation ditch as claimed in claim 2, characterized in that a treatment zone is arranged at the central island position.

* * * * *